United States Patent
Sha et al.

(10) Patent No.: US 10,808,463 B2
(45) Date of Patent: Oct. 20, 2020

(54) FRACTURING LIQUID DELIVERY HOSE FOR RECOVERY OF SHALE OIL AND GAS, AND MANUFACTURING METHOD AND CO-EXTRUSION MOLD THEREOF

(71) Applicant: 5ELEM HI-TECH CORPORATION, Taizhou, Jiangsu (CN)

(72) Inventors: Yuehua Sha, Taizhou (CN); Jinma Wang, Taizhou (CN); Donghui Wang, Taizhou (CN); Shanhong Zhou, Taizhou (CN)

(73) Assignee: 5ELEM HI-TECH CORPORATION, Taizhou (CN)

(*) Notice: Subject to any disclaimer, the term of this patent is extended or adjusted under 35 U.S.C. 154(b) by 72 days.

(21) Appl. No.: 16/005,658

(22) Filed: Jun. 11, 2018

(65) Prior Publication Data

US 2018/0298701 A1 Oct. 18, 2018

Related U.S. Application Data

(63) Continuation of application No. 14/347,188, filed as application No. PCT/CN2013/086105 on Oct. 29, 2013, now Pat. No. 9,995,092.

(30) Foreign Application Priority Data

Oct. 18, 2013 (CN) .......................... 2013 1 0489537

(51) Int. Cl.
*E21B 17/20* (2006.01)
*B29C 48/00* (2019.01)
(Continued)

(52) U.S. Cl.
CPC .............. *E21B 17/20* (2013.01); *B29C 33/20* (2013.01); *B29C 48/001* (2019.02);
(Continued)

(58) Field of Classification Search
CPC ..... E21B 17/20; E21B 43/26; B29C 48/0012; B29C 48/18; B29C 48/30; B29C 48/001;
(Continued)

(56) References Cited

U.S. PATENT DOCUMENTS 4,238,260 A  12/1980  Washkewicz
4,842,024 A * 6/1989  Palinchak .......... B60H 1/00571
                                                  138/109

(Continued)

FOREIGN PATENT DOCUMENTS

CN  2260937 Y  8/1997
CN  1181307 A  5/1998
(Continued)

OTHER PUBLICATIONS

International Search Report in PCT/CN2013/086105 dated Jul. 21, 2014, 3 pages.

*Primary Examiner* — Craig M Schneider
*Assistant Examiner* — David R Deal
(74) *Attorney, Agent, or Firm* — Metis IP LLC

(57) ABSTRACT

A fracturing liquid delivery hose for recovery of shale oil and gas, and manufacturing method and co-extrusion mold thereof are provided. The method includes extrusion of a cover layer with a first adhesive layer and an inner lining layer with a second adhesive layer, formation of an enhancement layer, heating and pressurizing for bonding between the cover layer and the enhancement layer and between the inner lining layer and the enhancement layer, so that the formed fracturing liquid delivery hose has resistance at least to high pressure and chemical corrosion. The cover layer and the inner lining layer can use different types of materials.

7 Claims, 1 Drawing Sheet

(51) Int. Cl.
*B29C 48/18* (2019.01)
*B29C 48/30* (2019.01)
*B29C 48/335* (2019.01)
*E21B 43/26* (2006.01)
*B29C 33/20* (2006.01)
*B29C 65/48* (2006.01)
*F16L 11/04* (2006.01)
*B29C 48/09* (2019.01)
*B29C 48/21* (2019.01)
*B29C 48/34* (2019.01)
*B29C 48/285* (2019.01)
*B29K 27/06* (2006.01)
*B29K 75/00* (2006.01)
*B29L 23/00* (2006.01)

(52) U.S. Cl.
CPC .......... *B29C 48/0012* (2019.02); *B29C 48/18* (2019.02); *B29C 48/30* (2019.02); *B29C 48/338* (2019.02); *B29C 65/48* (2013.01); *E21B 43/26* (2013.01); *F16L 11/04* (2013.01); B29C 48/09 (2019.02); B29C 48/21 (2019.02); B29C 48/285 (2019.02); B29C 48/34 (2019.02); B29K 2027/06 (2013.01); B29K 2075/00 (2013.01); B29L 2023/005 (2013.01)

(58) Field of Classification Search
CPC ....... B29C 48/285; B29C 48/09; B29C 48/21; B29C 48/34; F16L 11/04; B29K 2027/06; B29K 2075/00; B29K 2023/005
USPC ......................................................... 138/125
See application file for complete search history.

(56) References Cited

U.S. PATENT DOCUMENTS

| | | | | |
|---|---|---|---|---|
| 4,905,734 A | * | 3/1990 | Ito | F16L 11/08 138/125 |
| 4,907,625 A | * | 3/1990 | Ito | B60H 1/00571 138/125 |
| 4,998,565 A | * | 3/1991 | Kokuryu | F16L 11/045 138/125 |
| 5,264,262 A | * | 11/1993 | Igarashi | B60H 1/00571 138/125 |
| 5,690,146 A | * | 11/1997 | Stammen | F16L 11/045 116/208 |
| 6,089,277 A | * | 7/2000 | Kodama | F16L 11/08 138/124 |
| 6,652,939 B2 | * | 11/2003 | Smith | F16L 9/147 138/137 |
| 7,281,547 B2 | * | 10/2007 | Cleveland | B32B 1/08 138/137 |
| 7,497,236 B2 | * | 3/2009 | Hirai | F16L 11/085 138/125 |
| 7,654,288 B2 | * | 2/2010 | Fukaya | B32B 1/08 138/123 |
| 8,580,366 B2 | * | 11/2013 | Yamakawa | B32B 1/08 428/36.9 |
| 9,702,486 B2 | * | 7/2017 | Bourgeois | B32B 7/12 |
| 2017/0159850 A1 | * | 6/2017 | Wang | F16L 11/085 |

FOREIGN PATENT DOCUMENTS

| | | |
|---|---|---|
| CN | 101430030 A | 5/2009 |
| CN | 101837631 A | 9/2010 |
| CN | 101941013 A | 1/2011 |
| WO | 0041870 A1 | 7/2000 |

* cited by examiner

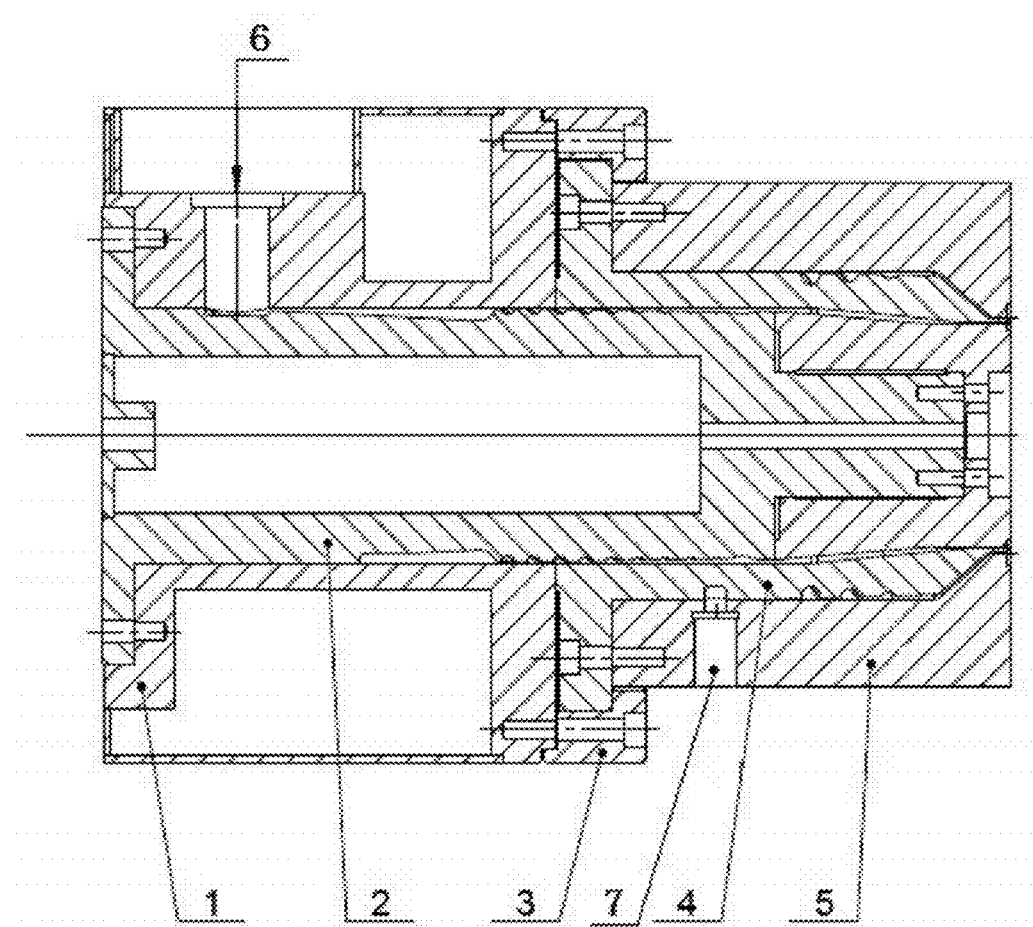

FRACTURING LIQUID DELIVERY HOSE FOR RECOVERY OF SHALE OIL AND GAS, AND MANUFACTURING METHOD AND CO-EXTRUSION MOLD THEREOF

CROSS-REFERENCE TO RELATED APPLICATIONS

The present application is a continuation of U.S. patent application Ser. No. 14/347,188, filed on Mar. 25, 2014, which is a U.S. National Stage entry under 35 U.S.C. § 371 of International Application No. PCT/CN2013/086105, filed on Oct. 29, 2013, designating the United States of America, which claims priority to Chinese Patent Application No. 201310489537.4, filed on Oct. 18, 2013, each of which is hereby incorporated by reference.

BACKGROUND

Technical Field

The present invention relates to a fracturing liquid delivery hose for recovery of shale oil and gas and manufacturing method and co-extrusion mold thereof and falls within the field of fluid delivery equipment.

Related Art

The hydrofracturing technology is the only method available for commercial recovery of shale oil and gas at present which relates to filling a high pressure liquid in a bore well to cause a terrane to fracture. A propping agent in the high pressure liquid allows a crack to hold up to serve as a high speed permeation channel for oil-gas drilling well. The fracturing liquid used in the hydrofracturing method available for recovery of shale gas essentially includes water, sand and chemical additives (salts and some emulsifying agents) with the content of water and sand being 99% or more. An amount of the fracturing liquid used for exploitation of shale gas is very high and a fracturing liquid of 4-5 million gallons (1 gallon corresponds to about 3.78 L) is required for each of the shale gas bore wells to make shale rupture.

Presently a metal pipe is commonly used for long distance delivery (about miles) for recovery of shale oil and gas which has disadvantages of high workload for layout difficulties in laying out on topographically complicated zones such as slope ravine and pond, and more severely, soil pollution can be caused by water leakage from pipe couplings susceptible to cracking.

SUMMARY

To solve the problems mentioned above, an objective of the present invention is to provide a fracturing liquid delivery hose for recovery of shale oil and gas and manufacturing method and co-extrusion mold thereof, where the hose of the present invention has layers strongly integrated to each other endures flexion, has long in service life, high resistance to high pressure, high flow rate in delivering liquid flowing therein, convenient connection, desirable weather-resistance and chemical-resistance, and is suitable for various topographies. When not being used, it is flat, can be easily wound up and occupies small space during storage and transportation.

The objective is achieved by the technical solutions as follows.

A method for manufacturing the fracturing liquid delivery hose for recovery of shale oil and gas includes the following steps.

(1) Forming a cover layer with an adhesive layer by extrusion, which includes extruding particles used to form a cover layer and a first adhesive layer by two extruders into a co-extrusion mold to form a co-extruded first laminate layer, subjecting the co-extruded first laminate layer to cooling, pulling and squashing the co-extruded first laminate layer to form a first flat tube. i.e., the cover layer with the first adhesive layer where the first adhesive layer has a thickness of 0.10-0.35 mm and the cover layer has a thickness of 0.5-4.0 mm.

(2) Forming an inner lining layer with an adhesive layer by extrusion, which includes extruding particles used to form an inner lining layer and a second adhesive layer by the two extruders into a co-extrusion mold to form a co-extruded second laminate layer, and subjecting the co-extruded second laminate layer to cooling, pulling and squashing the co-extruded second laminate layer to form a second flat tube, i.e., the inner lining layer with the second adhesive layer, where the second adhesive layer has a thickness of 0.10-0.35 mm and the inner lining layer has a thickness of 0.5-4.0 mm.

(3) Separately treating the surfaces of the co-extruded first and second laminate layers in Step (1) and Step (2), which includes immersing the first and second laminate layers in a solution for physical permeation prior to use, where the solution is formulated from a curing agent and solvent, and a mass ratio of the curing agent to the solvent ranges between 10:90 and 30:70.

(4) Forming an enhancement layer, which includes weaving a tubular enhancement layer according to product design specification.

(5) Bonding the cover layer with the enhancement layer to form a tubular third laminate layer, which includes pulling the surface-treated cover layer with the first adhesive layer in Step (3), that is, the first laminate layer into the tubular enhancement layer fixing both ends of the tubular enhancement layer and the pulled-in first laminate layer, introducing a steam of 0.10-0.35 Mpa into the tubular enhancement layer with the pulled-in first laminate layer for 4-10 minutes, and discharging the steam while introducing air into the tubular enhancement layer with the pulled-in first laminate layer to replace the steam, maintain the air pressure therein and cool the tubular enhancement layer with the pulled-in first laminate layer to a desired temperature, such that the tubular third laminate layer is formed by the tubular enhancement layer and the first laminate layer.

(6) Turning the tubular third laminate layer of Step (5) inside out, so that an inner surface of the tubular third laminate layer of Step (5) becomes an outer surface of the turned tubular third laminate layer.

(7) Bonding the inner lining layer with the enhancement layer of the turned third tubular laminate layer, which includes pulling the surface-treated inner lining layer with the second adhesive layer in Step (3), that is, the second laminate layer into the turned tubular third laminate layer of Step (6), fixing both ends of the turned tubular third laminate layer and the pulled-in second laminate layer, introducing a steam of 0.10-0.35 Mpa into the turned tubular third laminate layer with pulled-in second laminate layer for 4-10 minutes, and discharging the steam from while introducing air into the turned tubular third laminate layer with the pulled-in second laminate layer to replace the steam maintain the air pressure therein and cool the turned tubular third laminate layer with the pulled-in second laminate layer to a desired temperature.

In the method for manufacturing the fracturing liquid delivery hose for recovery of shale oil and gas, the cover layer described in Step (1) uses Thermoplastic Polyurethane (TPU) particles or a mixture of TPU and PolyVinyl Chloride (PVC) and the inner lining layer described in Step (2) uses TPU particles a mixture of TPU and PVC. PVC or a mixture of PVC and butyronitrile, where for the mixture of TPU and PVC, a condition of a mass ratio of TPU to PVC ranging between 100:0 and 100:70 is satisfied; for the mixture of PVC and butyronitrile, a condition of a mass ratio of PVC to butyronitrile ranging between 100:0 and 100:70 is satisfied. In Step (1) and Step (2) the particles used to form cover layer and inner lining layer are extruded at temperature of 150-210° C., and the particles used to form the first and second adhesive layers are extruded at temperature of 140-175° C.

In the method for manufacturing the fracturing liquid delivery hose for recovery of shale oil and gas, a color concentrate is also added to the particles used to form the cover layer and the inner lining layer described in Step (1) and/or Step (2). A mass ratio of the cover layer particles or the inner lining layer particles to the color concentrate ranges between 100:0.5 and 100:1.5, and then the cover layer particles or the inner lining layer particles are stirred to be blended with each other uniformly and dried.

In the method for manufacturing the fracturing liquid delivery hose for recovery of shale oil and gas, the enhancement layer described in Step (4) is woven from TERYLENE® brand polyethylene terephthalate filaments, nylon filaments, aramid fibers, a mixture of TERYLENE® brand polyethylene terephthalate filaments and nylon filaments or a mixture of TERYLENE®® brand polyethylene terephthalate filaments and aramid fibers.

The method for manufacturing the fracturing liquid delivery hose for recovery of shale oil and gas further includes passing the turned tubular third laminate layer through rollers to perform surface processing on the turned tubular third laminate layer.

The fracturing liquid delivery hose for recovery of shale oil and gas manufactured by the method is characterized in that it includes from outer to inner: the cover layer, the enhancement layer and the inner lining layer, where bonding between the cover layer and the enhancement layer and between the enhancement layer and the inner lining layer are achieved by the first and second adhesive layers, respectively.

In the fracturing liquid delivery hose for recovery of shale oil and gas, the cover layer has a thickness of 0.5-4.0 mm, the enhancement layer has a thickness of 1.5-5.0 mm, the inner lining layer has a thickness of 0.5-4.0 mm and each of the first and second adhesive layers has a thickness of 0.10-0.35 mm.

In the fracturing liquid delivery hose for recovery of shale oil and gas, the enhancement layer is woven by warp threads and weft filaments or fibers to be of tubular shape.

In the fracturing liquid delivery hose for recovery of shale oil and gas, the copper wire is woven uniformly along an axial direction in the enhancement layer for antistatic effect.

A co-extrusion mold includes a housing equipped with a shaft therein. A distributor block is provided below the shaft and has a lower part in a shape of a frustum. A gap exists between the shaft and the distributor block. The distributor block is fixedly connected to the housing. The housing has a first feed inlet connected to a TPU particle extruder for extruding particles used to form the cover layer or inner lining layer. The first feed inlet penetrates through the housing and is connected to the gap between the shaft and the distributor block. A mold case is arranged on the distributor block, where a gap exists between the mold case and the distributor block. The mold case is fixedly connected to the housing, and the mold case has a second feed inlet connected to an adhesive particle extruder for extruding particles used to form adhesive layer(s). The second feed inlet penetrates through the mold case and is connected to the gap between the mold case and the distributor block. A clamping ring is provided between the distributor block and the housing.

Advantageous Effects

1. The fracturing liquid delivery hose for recovery of shale oil and gas according to the present invention includes from outer to inner, the cover layer, the enhancement layer and the inner lining layer, where the first and second adhesive layers are used for bonding between the cover layer and enhancement layer and between the enhancement layer and the inner lining layer, respectively. The cover layer and the inner lining layer may be designed to be of different materials, with the inner lining layer using materials having resistance to chemical and oil corrosion, and the cover layer using materials having resistance to weather, ozone, wearing and piercing, to maximize the advantages of each of the various materials. As an embodiment of the present invention. TPU is used in both the cover layer and the inner lining layer, which are bonded to the enhancement layer by the adhesive agent by physical and chemical cross-linking, and an anti-peeling strength against of the hose can achieve 8 KNI. The layers of the hose are strongly integrated to each other, and remain bonding strongly to each other after a long time of service. The hose has significantly improved flexibility and service life. The process according to the present invention is simple in operation, high in efficiency, high in productive capacity and low in investment.

2. The hose produced by the method of the present invention is light in weight desirable in ductility, wear-resistant, corrosion-resistant, weather-resistant, can be connected to various standard fasteners, easily wound up, and easily assembled and disassembled. The inside-out turning process is used for the hose according to the present invention, with a length of more than 200 meters and inner diameters of 200 mm (8"), 250 mm (10"), 300 mm (12"), 400 mm (16"), 600 mm (24") or other various specifications.

3. In the present invention, the first and second adhesive layers enable firm bonding between the cover layer and the enhancement layer and between the inner lining layer and the enhancement layer, leading to improved anti-peeling strength, higher overall integration of the hose and improved service life. In the present invention, the inside-out turning process is carried out by laminating the cover layer and the first adhesive layer by mechanical co-extrusion to form a first laminate layer, immersing the first laminate layer in the curing agent solution, pulling the first laminate layer into the enhancement layer, bonding the first laminate layer with the enhancement layer, turning the bonded layers inside-out, passing the turned bonded layers through rollers to perform surface processing on the turned bonded layer, sand laminating the inner lining layer and the adhesive layer by co-extrusion to form a second laminate layer, immersing the second laminate layer in the curing agent solution, pulling the second laminate layer into the cover layer/enhancement layer and bonding at elevated temperature and pressure. The process is advantageous in that the cover layer and inner lining layer can use different materials according to their respective functions, and the operation is easy and with high efficiency.

4. In the present invention, a special co-extrusion mold is designed to achieve easy operation and high efficiency.

BRIEF DESCRIPTION OF THE DRAWINGS

FIG. 1 is a schematic illustration of the structure of the co-extrusion mold of the present invention.

DETAILED DESCRIPTION

Embodiment 1

The fracturing liquid delivery hose for recovery of shale oil and gas includes from outer to inner, a cover layer, an enhancement layer and an inner lining layer, where bonding between the cover layer and the enhancement layer and between the enhancement layer and the inner lining layer are achieved by first and second adhesive layers, respectively.

The cover layer has a thickness of 0.5 mm, the enhancement layer has a thickness of 5.0 mm, the inner lining layer has a thickness of 4.0 mm, and each of the first and second adhesive layers has a thickness of 0.35 mm.

The enhancement layer is woven by warp and weft filaments or fibers to be of tubular shape.

Embodiment 2

This embodiment is different from Embodiment 1 in that, the cover layer has a thickness of 4.0 mm, the enhancement layer has a thickness of 1.0 mm, the inner lining layer has a thickness of 4.0 mm, and each of the first and second adhesive layers has a thickness of 0.10 mm. The material of the warp and weft filaments or fibers is nylon.

Embodiment 3

This embodiment is different from Embodiment 1 in that, the cover layer has a thickness of 2.5 mm, the enhancement layer has a thickness of 3.5 mm, the inner lining layer has a thickness of 2.5 mm, and each of the first and second adhesive layers has a thickness of 0.25 mm. Moreover, two copper wires are uniformly distributed along an axial direction in the enhancement layer. Addition of copper wires achieves antistatic effect.

Embodiment 4

This embodiment is different from the preceding embodiments in that, eight copper wires are uniformly distributed along an axial direction in the enhancement layer. In other embodiments, a number of the copper wires can be 3, 4, 5, 6 or 7.

Embodiment 5

A method for manufacturing the fracturing liquid delivery hose for recovery of shale oil and gas includes the following steps:

(1) Forming a cover layer with an adhesive layer by extrusion, which includes extruding particles, used to form the cover layer and a first adhesive layer by two extruders into a co-extrusion mold to form a co-extruded first laminate layers, subjecting the co-extruded first laminate layer to cooling, pulling and squashing the co-extruded first laminate layer to form a first flat tube, i.e., the cover layer with the first adhesive layer where the first adhesive layer has a thickness of 0.10-0.35 mm and the cover layer has a thickness of 0.5-4.0 mm.

(2) Forming an inner lining layer with an adhesive layer by extrusion, which includes extruding particles used to form the inner lining layer and a second adhesive layer by two extruders into a co-extrusion mold to form a co-extruded second laminate layer, and subjecting the co-extruded second laminate layer to cooling, pulling and squashing the co-extruded second laminate layer to form a second flat tube, i.e., the inner lining layer with the second adhesive layer, where the second adhesive layer has a thickness of 0.10-0.35 mm and the inner lining layer has a thickness of 0.5-4.0 mm.

(3) Separately treating the surfaces of the co-extruded first and second laminate layers in Step (1) and Step (2), which includes immersing the first and second laminate layers in a solution for physical permeation prior to use, where the solution is formulated from a curing agent and ethyl acetate, and a ratio of the curing agent to the ethyl acetate ranges between 10:90 and 30:70. In this embodiment, the adhesive particles are TPU hot melt adhesive. Specifically, UB410B from Lubrizol Corp. is used in this embodiment. The curing agent in this embodiment is a material named diphenylmethane diisocyanate (MDI), and BASF M20S is adopted. The curing agent (having an active NCO) can be bonded firmly, through physical permeation and chemical reaction at a certain temperature and pressure, to the TERYLENE® brand polyethylene terephthalate filaments which has a hydroxyl group. The amino-isocyanate of nylon can serve as active site readily reacting with hydroxyl and amino groups to form carbamate and urea structure, which also firmly bond together by physical permeation and chemical reaction at certain temperature and pressure. The treated aramid fiber can contain amino and isocyanate groups, which can also firmly bond through physical permeation and chemical reaction with the curing agent at a certain temperature and pressure.

(4) Forming an enhancement layer, which includes weaving a tubular enhancement layer according to product design specification.

(5) Bonding the cover layer with the enhancement layer to form a tubular third laminate layer, which includes pulling the surface-treated cover layer with the first adhesive layer in Step (that is, the first laminate layer, into the tubular enhancement layer, fixing both ends of the tubular enhancement layer and the pulled-in first laminate layer, introducing a steam of 0.10-0.35 Mpa into the tubular enhancement layer with the pulled-in first laminate layer for 4-10 minutes, and discharging the steam while introducing air into the tubular enhancement layer with the pulled-in first laminate layer to replace the steam, maintain the air pressure therein and cool the tubular enhancement layer with the pulled-in first laminate layer to a desired temperature such that the tubular third laminate layer is formed by the tubular enhancement layer and the first laminate layer.

(6) Turning the tubular third laminate layer of Step (5) inside out so that an inner surface of the tubular third laminate layer of Step (5) becomes an outer surface of the turned tubular third laminate layer.

(7) Passing the turned tubular third laminate layer from Step (6) through rollers to perform surface processing on the turned tubular third laminate layer.

(8) Bonding the inner lining layer with the enhancement layer of the turned third tubular laminate layer, which includes pulling the surface-treated inner lining layer with the second adhesive layer in Step (3), that is, the second laminate layer, into the turned tubular third laminate layer of Step (7), fixing both ends of the turned tubular third laminate layer and pulled-in second laminate layer, introducing a steam of 0.10-0.35 Mpa into the turned tubular third laminate layer with pulled-in second laminate layer for 4-10 minutes, and discharging the steam while introducing air into the turned tubular third laminate layer with pulled-in second laminate layer to replace the steam, maintain the air pressure therein and cool the turned tubular third laminate layer with pulled-in second laminate layer to a desired temperature.

In this embodiment, the cover layer and the inner lining layer are made of TPU, specifically, a polyether type TPU, named R185A, of Lubrizol Corp.

Embodiment 6

This embodiment is different from Embodiment 5 in that, the cover layer uses polyether type TPU (R185A of Lubrizol Corp.) the inner lining layer uses liner PVC (medical grade PVC of Shanghai Chloro-Alkali Chemical Co., Ltd.) or a mixture of PVC and butyronitrile (medical grade PVC of Shanghai Chloro-Alkali Chemical Co., Ltd., the Powder Nitrile Butadiene Rubber (PNBR) is LG830 of LG Chemical, a mass ratio of PVC to powdered butyronitrile ranges between 100:0 and 100:70).

Embodiment 7

This embodiment is different from Embodiment 6 in that, the enhancement layer described in Step (4) is woven from TERYLENE® brand polyethylene terephthalate filaments, nylon or aramid fibers.

Embodiment 8

A co-extrusion mold, as shown in FIG. 1, includes a housing 1 equipped with a shaft 2 therein. A distributor block 4 is provided below the shaft and has a lower part in the shape of a frustum. A gap exists between the shaft 2 and the distributor block 4. The distributor block 4 is fixedly connected to the housing 1. The housing 1 has a first feed inlet 6 connected to a TPU particle extruder for extruding the particles used to form the cover layer or inner lining layer. The first feed inlet 6 penetrates through the housing 1 and is connected to the gap between the shaft 2 and the distributor block 4. A mold case 5 is arranged on the distributor block 4 where a gap exists between the mold case 5 and the distributor block 4. The mold case 5 is fixedly connected to the housing 1, and the mold case 5 has a second feed inlet 7 connected to an adhesive particle extruder for extruding particle used to form adhesive layer(s). The second feed inlet 7 penetrates through the mold case 5 and is connected to the gap between the mold case 5 and the distributor block 4. In operation, the shaft 2 rotates, and because the first feed inlet 6 is connected to the gap between the shaft 2 and the distributor block 4, TPU flows out along the gap between the shaft 2 and the distributor block 4. The adhesive is fed through the second feed inlet 7 and flows out along the gap between the distributor block 4 and the mold case 5. The lower part of the distributor block is in the shape of a frustum such that a gap between a TPU extruding port and an adhesive extruding port is very small, thereby allowing the adhesive to be attached on the outer layer of the produced TPU tube to form a final product obtained at high temperature.

Embodiment 9

In the co-extrusion mold described in Embodiment 8, a clamping ring 3 is provided between the distributor block 4 and the housing.

What is claimed is:

1. A liquid delivery hose, comprising:
 a first tube including a cover layer and a first adhesive layer, the first adhesive layer being attached inside the cover layer;
 a second tube including a lining layer and a second adhesive layer, the second adhesive layer being attached outside the lining layer, wherein the lining layer of the second tube includes Thermoplastic Polyurethane (TPU), a mixture of TPU and Polyvinyl Chloride (PVC), or a mixture of PVC and butyronitrile; and
 a third tube having an inner surface and an outer surface, wherein the third tube includes woven filaments,
 wherein the first adhesive layer of the first tube is bonded with the outer surface of the third tube, and the second adhesive layer of the second tube is bonded with the inner surface of the third tube.

2. The liquid delivery hose of claim 1, wherein the first adhesive layer is bonded with the cover layer, and wherein:
 the cover layer is formed by a plurality of first particles, the plurality of first particles being extruded by a first part of a co-extrusion mold; and
 the first adhesive layer is formed by a plurality of second particles, the plurality of second particles being extruded by a second part of the co-extrusion mold.

3. The liquid delivery hose of claim 2, wherein the plurality of first particles include a color concentrate.

4. The liquid delivery hose of claim 1, wherein the cover layer of the first tube and the lining layer of the second tube are made of different materials.

5. The liquid delivery hose of claim 1, wherein:
 the cover layer of the first tube includes Thermoplastic Polyurethane (TPU) or a mixture of TPU and Polyvinyl Chloride (PVC).

6. The liquid delivery hose of claim 1, wherein the third tube is manufactured by weaving a tubular enhancement layer using filaments or fibers including at least one of TERYLENE® brand polyethylene terephthalate filaments, nylon filaments, and aramid fibers.

7. The liquid delivery hose of claim 6, wherein the third tube includes a copper wire woven along an axial direction of the tubular enhancement layer.

* * * * *